US010579323B2

(12) United States Patent
Takeuchi et al.

(10) Patent No.: US 10,579,323 B2
(45) Date of Patent: Mar. 3, 2020

(54) DISPLAY DEVICE AND NON-TRANSITORY COMPUTER READABLE MEDIUM (71) Applicant: FUJI XEROX CO., LTD., Tokyo (JP)

(72) Inventors: Yuri Takeuchi, Kanagawa (JP); Masafumi Ono, Kanagawa (JP); Tomotaka Matsuyuki, Kanagawa (JP); Sayaka Hirose, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 0 days.

(21) Appl. No.: 15/905,102

(22) Filed: Feb. 26, 2018

(65) Prior Publication Data

US 2018/0275942 A1 Sep. 27, 2018

(30) Foreign Application Priority Data

Mar. 24, 2017 (JP) .................. 2017-058437

(51) Int. Cl.
G06F 3/147 (2006.01)
G10L 15/22 (2006.01)
G06F 3/16 (2006.01)
H04N 5/44 (2011.01)

(52) U.S. Cl.
CPC .............. *G06F 3/147* (2013.01); *G06F 3/16* (2013.01); *G06F 3/167* (2013.01); *G10L 15/22* (2013.01); *H04N 5/4403* (2013.01)

(58) Field of Classification Search
CPC ............. G06F 3/147; G06F 3/16; G10L 15/22
See application file for complete search history.

(56) References Cited

U.S. PATENT DOCUMENTS

| 2012/0066705 | A1* | 3/2012 | Harada | H04N 21/4662 725/12 |
| 2016/0255162 | A1* | 9/2016 | Frieder | H04L 67/20 709/204 |
| 2016/0275833 | A1* | 9/2016 | Forbes | G06K 9/00335 |
| 2016/0283793 | A1* | 9/2016 | Leckey | G06K 9/00221 |
| 2017/0214945 | A1* | 7/2017 | Chang | H04H 20/71 |
| 2018/0351756 | A1* | 12/2018 | Dave | H04L 12/1822 |

* cited by examiner

Primary Examiner — Michael Le
(74) Attorney, Agent, or Firm — Sughrue Mion, PLLC (57) ABSTRACT A display device includes a display, a viewer identification unit, and a personal information display controller. The display displays content. The viewer identification unit identifies a viewer who is viewing the content. The personal information display controller causes, in a case where the degree of interest of the viewer in the content has reached a predetermined value or more, the content and pre-registered personal information of the viewer to be displayed on the display.

10 Claims, 8 Drawing Sheets

| USER ID | FACE IMAGE DATA | PERSONAL INFORMATION ||||||||| WANT-TO-BE-TALKED-TO FLAG | POSITIONAL INFORMATION DISCLOSURE FLAG |
| | | NAME | AGE | JOB TYPE | SKILL/ QUALIFICATION | HOBBY | TYPE OF PERSON WHOM USER WANTS TO MEET | TYPE OF PROJECT USER WANTS TO JOIN | COMMENT | ... | | |
| User0001 | Face0001.jpg | TARO FUJI | 25 | WEB DESIGNER | HTML JavaScript | SOCCER | LEADER | NEW BUSINESS PROJECT | I AM LOOKING FOR A NEW PROJECT! | ... | 1 | 0 |
| User0002 | Face0002.jpg | ... | ... | ... | ... | ... | ... | ... | ... | ... | ... | ... |
| User0003 | Face0003.jpg | ... | ... | ... | ... | ... | ... | ... | ... | ... | ... | ... |
| ... | ... | ... | ... | ... | ... | ... | ... | ... | ... | ... | ... | ... |

DISPLAY DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-058437 filed Mar. 24, 2017.

BACKGROUND

(i) Technical Field

The present invention relates to a display device and a non-transitory computer readable medium.

(ii) Related Art

Display devices that are installed in public places or the like and display content such as advertisement have been known. For example, digital signage systems have been known as the above-mentioned display devices.

SUMMARY

According to an aspect of the invention, there is provided a display device including a display, a viewer identification unit, and a personal information display controller. The display displays content. The viewer identification unit identifies a viewer who is viewing the content. The personal information display controller causes, in a case where the degree of interest of the viewer in the content has reached a predetermined value or more, the content and pre-registered personal information of the viewer to be displayed on the display.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described.

Figure 1:
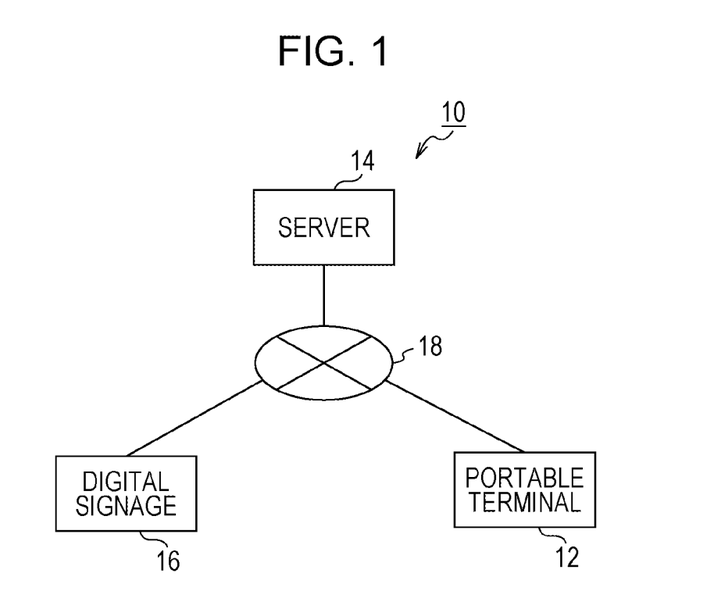
FIG. 1 is a configuration schematic diagram of a digital signage system according to an exemplary embodiment.

FIG. 1 is a configuration schematic diagram of a digital signage system 10 according to an exemplary embodiment of the present invention. The digital signage system 10 includes a portable terminal 12, a server 14, and a digital signage 16 as a display device. In the digital signage system 10, the portable terminal 12, the server 14, and the digital signage 16 are connected such that they are able to communicate with each other via a communication line 18 such as the Internet or a local area network (LAN). In FIG. 1, one portable terminal 12 and one digital signage 16 are illustrated. However, the digital signage system 10 may include plural portable terminals 12 or plural digital signages 16.

The digital signage system 10 is a system for transmitting information in a public place. Specifically, the server 14 distributes content to the digital signage 16, and the digital signage 16 displays the content or displays the content and outputs sound. As described in detail below, in the digital signage system 10, a mechanism for encouraging interaction between plural viewers who are viewing content displayed on the digital signage 16 is provided.

The digital signage system 10 is used in a space where people having a certain purpose gather. In this exemplary embodiment, the digital signage system 10 is used in a shared work space where people from various industries and jobs gather. In general, purposes of shared work spaces are to gather members who join a new project, increase the value of a work by interaction between people, and the like. Therefore, such a shared work space may be defined as a place where the digital signage system 10 that encourages interaction between plural viewers who are viewing content is used effectively.

Obviously, the digital signage system 10 is not necessarily used in a shared work space. The digital signage system 10 may be used in various situations. For example, the digital signage system 10 may be used in a space where an unspecified number of people come and go (such as a station square), as well as a space where people having a certain purpose gather.

The portable terminal 12 is, for example, a smartphone or a tablet terminal that is carried and used by a user of the digital signage system 10. The portable terminal 12 is usually used to register user information including personal information of the user in the server 14. The user transmits, using the portable terminal 12, a new registration request and user information to the server 14, and the user information is thus registered in the server 14. Hereinafter, a user who uses the digital signage system 10 (may be a user who uses a space where the digital signage system 10 is used) is referred to as a "user", and a person, among users, who views content displayed on the digital signage 16 is referred to as a "viewer".

The portable terminal 12 includes a controller including a central processing unit (CPU), a microcomputer, or the like and controlling each unit of the portable terminal 12, a memory including a read only memory (ROM), a random access memory (RAM), or the like, a display including a liquid crystal panel or the like, an input unit including a touch panel, a button, or the like, and a communication unit including a network adaptor or the like. Furthermore, preferably, the portable terminal 12 may include a global positioning system (GPS) unit that identifies the position of the portable terminal 12 or a short-range communication unit for performing short-range communication such as Bluetooth® communication with other devices.

The digital signage system 10 may include a stationary-type terminal, in place of the portable terminal 12. In this case, it is preferable that the terminal is installed at an entrance of a shared work space or the like so that a user is able to register his or her own user information using the terminal when entering the shared work space or the like.

Figure 2:
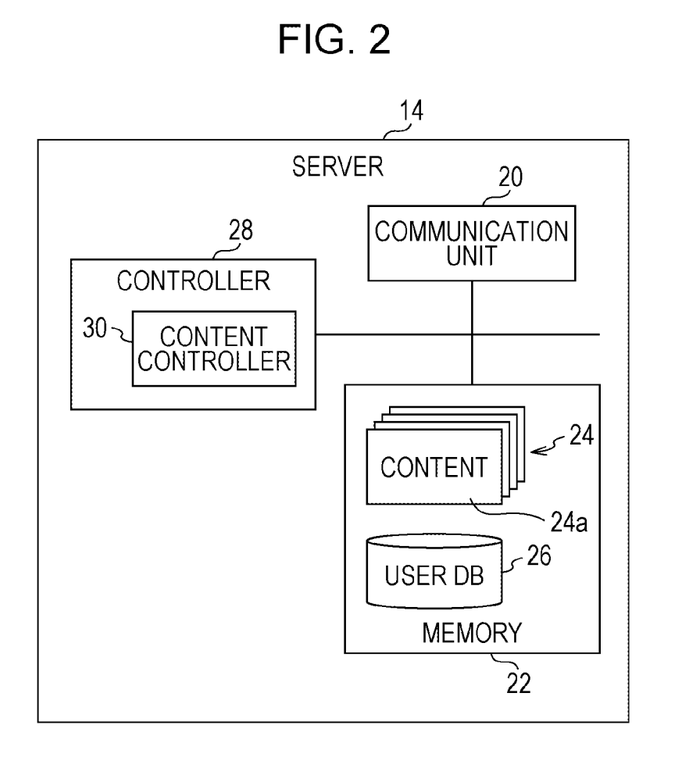
FIG. 2 is a configuration schematic diagram of a server according to an exemplary embodiment.

FIG. 2 is a configuration schematic diagram of the server 14. The server 14 may be configured as any type of computer as long as it exhibits functions described below. Units of the server 14 will be described below.

A communication unit 20 includes, for example, a network adaptor or the like. The communication unit 20 includes a function to communicate with the portable terminal 12 and the digital signage 16 via the communication line 18. For example, the communication unit 20 receives user information of a user transmitted from the portable terminal 12. Alternatively, the communication unit 20 transmits content 24a stored in a memory 22, which will be described later, to the digital signage 16.

The memory 22 includes, for example, a hard disk, a ROM, a RAM, or the like. A program for operating each unit of the server 14 is stored in the memory 22. As illustrated in FIG. 2, a content group 24 including plural pieces of content 24a is stored in the memory 22. Furthermore, a user database (DB) 26 is defined in the memory 22.

The content 24a is transmitted to the digital signage 16 and output from the digital signage 16, as described above. The content 24a may include not only images but also sound. Content 24a to be transmitted to each of the digital signages 16 is designated from among the content group 24 by a controller 28 (more specifically, a content controller 30), which will be described later.

The content 24a may include various contents. For example, the content 24a may be an article on personnel recruitment, an article describing contents of a new business project, a self-introduction article, or advertisement for a product or service.

Each piece of the content 24a may be assigned attribute information corresponding to contents of the content 24a. Attribute information may be, for example, "for business", "for hobby", "for advertising", "for personnel recruitment", or the like.

The content 24a is created in advance by a content provider (for example, a person who establishes a new business project and looks for those who want to join the project, or the like) and stored (registered) in the memory 22. Furthermore, contents of attribute information assigned to each piece of the content 24a may also be set by the content provider. The content provider may be a user of the digital signage system 10.

User information on a user of the digital signage system 10 is stored in the user DB 26. A user inputs his or her own user information using the portable terminal 12, prior to use of the digital signage system 10. The input user information is transmitted to the server 14 from the portable terminal 12. Accordingly, user information of each user is stored (registered) in the user DB 26. Alternatively, for at least part of user information registered in the user DB 26, the server 14 may collect information registered on social networking service (SNS) used by a user after permission by the user is received.

Figure 3:
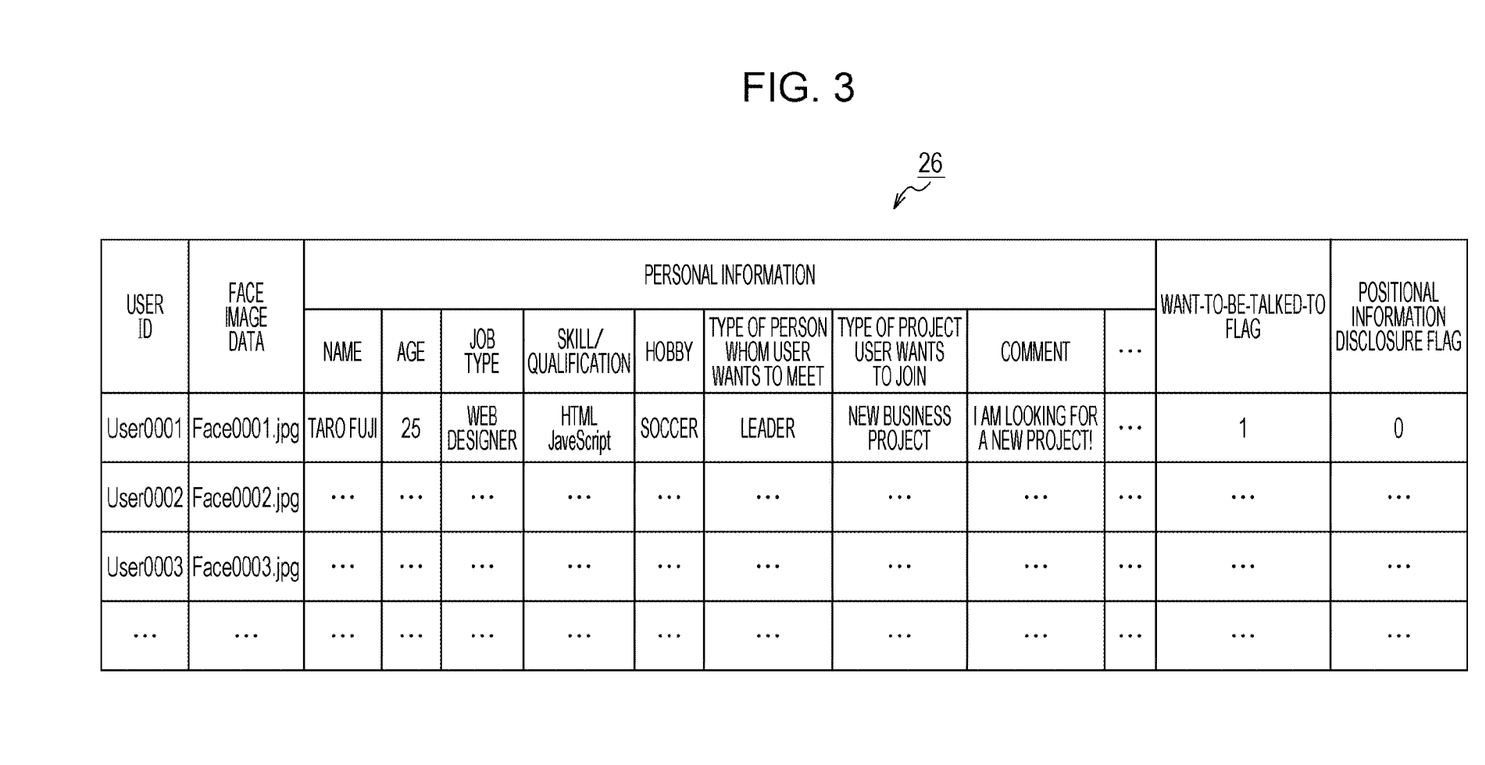
FIG. 3 is a conceptual diagram illustrating an example of contents of a user database.

FIG. 3 illustrates an example of contents of the user DB 26. In FIG. 3, the user DB 26 is represented in a table format, and one record corresponds to one user. Obviously, the data format of the user DB 26 is not limited to the table format. When a new registration request and user information are transmitted from the portable terminal 12, a new record for a corresponding user is added to the user DB 26.

As illustrated in FIG. 3, in this exemplary embodiment, user information stored in the user DB 26 includes a user ID, face image data, personal information, a want-to-be-talked-to flag, and positional information disclosure flag. In the user DB 26, the above items of information are stored in association with each other. Obviously, user information may include other items of information.

A user ID represents an identification number for uniquely identifying a user of the digital signage system 10. As a user ID, a unique number may be selected when a new registration information and user information are transmitted (that is, when a new record is added), and the selected number may be automatically assigned.

In this exemplary embodiment, face image data is face photograph data of a user. Face photograph data is transmitted from the portable terminal 12. For example, a user captures, using a camera or the like of the portable terminal 12, a face photograph of his or her own face. The obtained face photograph data and personal information are transmitted to the server 14, and are thus stored in the user DB 26. As described later, face image data is information that is used to identify a viewer who is viewing the digital signage 16. Therefore, in place of face photograph data, information with which processing for identifying a viewer may be achieved (for example, an information group representing plural feature points of a face) or the like may be used as face image data.

Personal information is information representing the profile of a corresponding user. In other words, personal information may be defined as information representing the background of a corresponding user. Personal information may include plural items. In this exemplary embodiment, as illustrated in FIG. 3, personal information includes name, age, job type, skill/qualification, hobby, type of person whom a user wants to meet, type of project a user wants to join, comment, and so on. Obviously, the items of personal information illustrated in FIG. 3 are merely examples. Personal information may include other items. Such personal information, that is, values (contents) corresponding to plural items, are input by a user using the portable terminal 12, transmitted to the server 14, and stored in the user DB 26. Even after user information is registered in the user DB 26, the registration contents of personal information may be changed in accordance with an instruction from a user.

A want-to-be-talked-to flag may have a value "1" (ON) or "0" (OFF). In the case where a want-to-be-talked-to flag represents "1", the flag represents that a corresponding user indicates an intention of wanting to be talked to by others. In contrast, in the case where a want-to-be-talked-to flag represents "0", the flag represents that a corresponding user indicates an intention of not wanting to be talked to by others. The value of a want-to-be-talked-to flag may be set using the portable terminal 12. For example, a user inputs personal information and information indicating whether or not the user wants to be talked to by others to the portable terminal 12. Then, the personal information and the want-to-be-talked-to flag are transmitted to the server 14 from the portable terminal 12. As described in detail later, in this exemplary embodiment, the value of a want-to-be-talked-to flag may be set by operating the digital signage 16.

The want-to-be-talked-to flag is usually used to determine whether or not personal information of a user is to be displayed on the digital signage 16. In the case where plural digital signages 16 are provided, a want-to-be-talked-to flag may be set individually for each of the digital signages 16. Accordingly, for example, a user may perform setting such that personal information is not displayed on a digital signage 16 that is installed in a place (for example, a resting place) where a relatively large number of people may view the digital signage 16 in a shared work space and personal information is displayed on a digital signage 16 that is installed in a place (for example, a booth where people who join a specific project gather) where specific people may view the digital signage 16.

Furthermore, the value of a want-to-be-talked-to flag may be changed in accordance with an instruction from a user after the flag is once set. Accordingly, a user is able to perform setting such that the want-to-be-talked-to flag was set to "0" yesterday because the user did not want to be talked to and the want-to-be-talked-to flag was changed to "1" today because the user wants to be talked to.

A positional information disclosure flag may have a value "1" (ON) or "0" (OFF). In the case where a positional information disclosure flag represents "1", the flag represents that a corresponding user indicates an intention of wanting to notify others of his or her location. In contrast, in the case where a positional information disclosure flag represents "0", the flag represents that a corresponding user indicates an intention of not wanting to notify others of his or her location. The value of a positional information disclosure flag may also be set using the portable terminal 12. For example, a user inputs personal information and information indicating whether or not the user wants to notify others of the location of the user to the portable terminal 12. Then, the personal information and the value of the positional information disclosure flag are transmitted to the server 14 from the portable terminal 12. Furthermore, in this exemplary embodiment, as with the want-to-be-talked-to flag, the positional information disclosure flag may be set by operating the digital signage 16.

The positional information disclosure flag is used to determine whether or not positional information of a user is to be displayed on the digital signage 16. As with the want-to-be-talked-to flag, in the case where plural digital signages 16 are provided, the positional information disclosure flag may be set individually for each of the digital signages 16. Furthermore, the positional information disclosure flag may be changed in accordance with an instruction from a user after the flag is once set.

Referring back to FIG. 2, the controller 28 includes, for example, a CPU or the like, and controls each unit of the server 14 in accordance with a program stored in the memory 22. Furthermore, as illustrated in FIG. 2, the controller 28 also functions as the content controller 30.

The content controller 30 controls content to be displayed on the digital signage 16. Specifically, the content controller 30 performs processing for selecting one or more pieces of content 24a from the content group 24 stored in the memory 22 and transmitting the selected one or more pieces of content 24a to the digital signage 16. The transmitted content 24a is displayed on the digital signage 16. The content 24a to be selected by the content controller 30 may be determined, for example, according to the place where the digital signage 16 is installed or time. Furthermore, plural pieces of content 24a may be transmitted to one digital signage 16 so that the plural pieces of content 24a may be displayed on the digital signage 16 at the same time or displayed sequentially in a switching manner. The content 24a to be displayed on the digital signage 16 may be changed according to the time during which a viewer stays near the digital signage 16, an operation on the digital signage 16 by the viewer, or the like.

Figure 4:
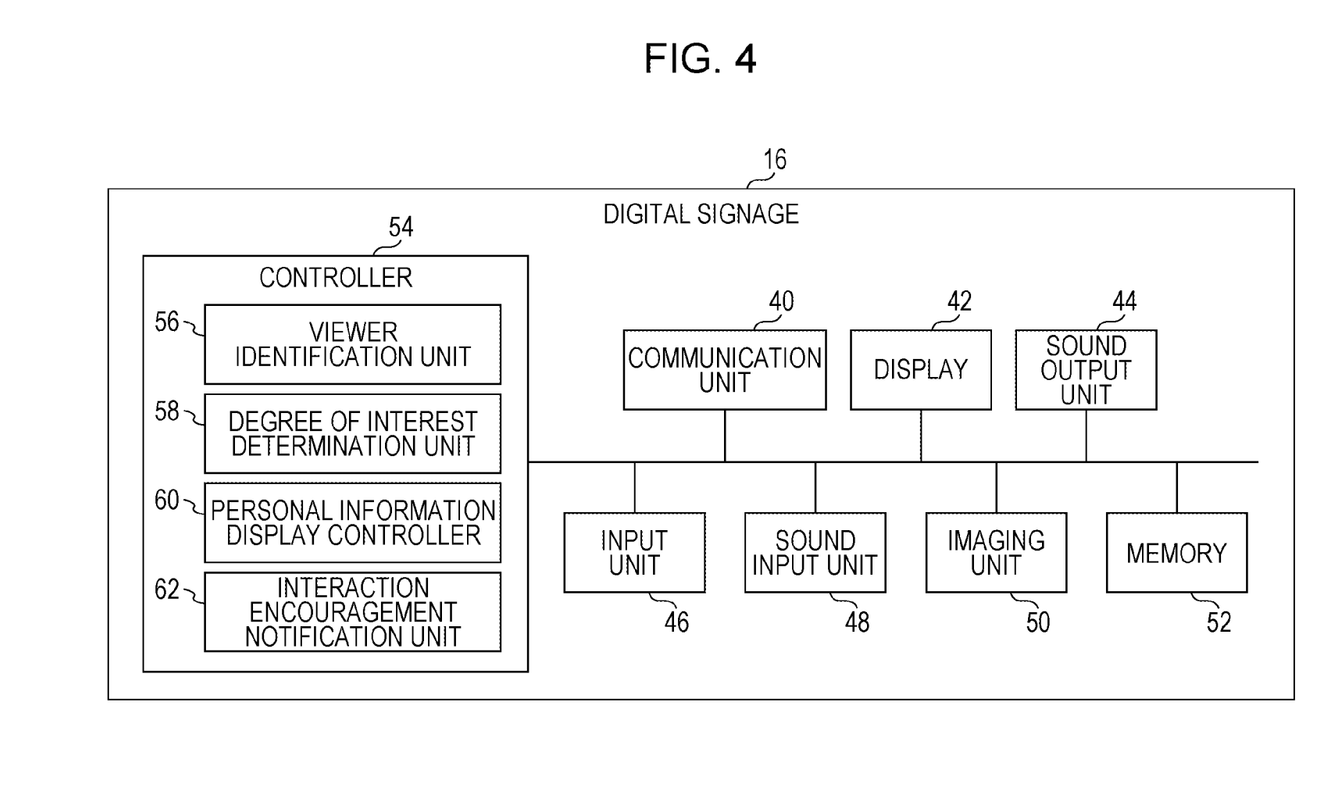
FIG. 4 is a configuration schematic diagram of a digital signage according to an exemplary embodiment.

FIG. 4 is a configuration schematic diagram of the digital signage 16. Units of the digital signage 16 will be described below with reference to FIG. 4.

A communication unit 40 includes, for example, a network adaptor or the like. The communication unit 40 includes a function to communicate with the server 14 via the communication line 18. Specifically, the communication unit 40 receives the content 24a transmitted from the server 14. Alternatively, the communication unit 40 may transmit user information of an operator to the server 14 in accordance with an operation on the digital signage 16 by the operator.

Furthermore, the communication unit 40 may include, for example, a Bluetooth adaptor or the like, and may include a function of short-range communication such as Bluetooth communication.

A display 42 includes, for example, a liquid crystal panel or the like. The display 42 displays the content 24a transmitted from the server 14. Furthermore, as described later, in the case where a certain condition is satisfied, personal information of a viewer or the like is displayed on the display 42. Alternatively, in the case where a certain condition is satisfied, text or the like for encouraging interaction between plural viewers who are viewing the displayed content 24a is displayed on the display 42.

Furthermore, the display 42 may include a transparent or semitransparent screen and a projector that projects the content 24a onto the screen. With such a configuration of the display 42, a viewer is able to view the content 24a from both sides (front face and back face) of the screen. Obviously, in the case where the content 24a is displayed so as to be viewed as a front image when the content 24a is viewed from the front side, the content 24a may be viewed as a left-right inverted image when the content 24a is viewed from the back side. Therefore, it is preferable that switching as to whether a front image is to be displayed on the front side or back side may be achieved by an operation such as touch on the screen by a viewer. With such a switching operation, for example, a projection image may be left-right inverted at the projector. Alternatively, two projectors including a projector for projecting a front image on the front side and a projector for projecting a front image on the back side may be provided so that a projector that projects the content 24a may be switched in accordance with an operation by a viewer.

A sound output unit 44 includes, for example, a speaker, a driving circuit for the speaker, and the like. In the case where the content 24a includes sound, a content image is displayed on the display 42, and the sound is output from the sound output unit 44. Furthermore, by an interaction encouragement notification unit 62, which will be described later, various sounds for encouraging interaction between plural viewers are output from the sound output unit 44.

An input unit 46 includes, for example, a touch panel, a button, or the like. A viewer is able to input, using the input unit 46, various types of information to the digital signage 16. In this exemplary embodiment, under the control of a controller 54, which will be described later, various buttons are displayed on the display 42, and a viewer is able to input, by pressing the buttons, various types of information to the digital signage 16.

For example, buttons for setting whether or not a viewer wants to be talked to, such as a "Yes" button and a "No" button that are displayed together with text "Do you want to be talked to?", may be displayed, so that the viewer may register whether or not the viewer wants to be talked to (that is, set the value of a want-to-be-talked-to flag in the user DB 26) by touching a corresponding button. Furthermore, buttons for setting whether or not positional information of a viewer is to be open to public may be displayed on the display 42, so that the viewer may register whether or not positional information is to be open to public (that is, set the value of a positional information disclosure flag in the user DB 26) by touching a corresponding button.

A sound input unit 48 includes, for example, a microphone, an amplification circuit, and the like. The sound input unit 48 acquires sound around the digital signage 16, in particular, voice of a viewer. The voice of a viewer acquired by the sound input unit 48 is analyzed by the controller 54, which will be described later, and sound information determined based on the analyzed contents may be output as sound from the sound output unit 44. That is, with the sound output unit 44 and the sound input unit 48, a viewer is able to interact with the digital signage 16.

An imaging unit 50 includes, for example, a camera or the like. The imaging unit 50 in this exemplary embodiment is provided at the display 42 (for example, at the upper edge of the display 42), and a front side of the display 42 is defined as a photographing region. That is, the imaging unit 50 may capture an image of a person who comes to the front side of the display 42.

A memory 52 includes, for example, a hard disk, a ROM, a RAM, or the like. A program for causing each unit of the digital signage 16 to operate is stored in the memory 52. Furthermore, the content 24a transmitted from the server 14, various types of control data, various processing results, and the like are stored in the memory 52.

The controller 54 includes, for example, a CPU, a microcontroller, and the like. The controller 54 controls each unit of the digital signage 16 in accordance with a program stored in the memory 52. Furthermore, as illustrated in FIG. 4, the controller 54 functions as a viewer identification unit 56, a degree of interest determination unit 58, a personal information display controller 60, and an interaction encouragement notification unit 62. These functions provided in the controller 54 will be described below.

The viewer identification unit 56 detects a viewer who is viewing the content 24a displayed on the display 42. The viewer identification unit 56 also performs processing for identifying a detected viewer. In this exemplary embodiment, the viewer identification unit 56 detects or identifies a viewer, based on a photographed image acquired by the imaging unit 50. Specifically, in a case where a person is detected within a photographed image, the viewer identification unit 56 detects that a viewer is present. Furthermore, the viewer identification unit 56 calculates the degree of similarity between the face of a person extracted from a photographed image and each piece of face image data registered in the user DB 26 stored in the memory 22 of the server 14, and identifies face image data with the highest degree of similarity from among plural pieces of face image data having a degree of similarity that is equal to or more than a predetermined value. Then, the viewer identification unit 56 identifies a user corresponding to the identified face image data as a viewer. In the case where plural viewers are present, the viewer identification unit 56 may identify plural viewers.

The degree of similarity between the face of a person extracted from a photographed image and face image data may be calculated using a known technique. For example, plural feature points may be extracted from both face images so that the degree of similarity between the face images may be calculated in accordance with the distance between the feature points.

The viewer identification unit 56 may detect or identify a viewer using other methods. For example, in the case where after a user registers user information in the server 14, a user ID is notified to the portable terminal 12 from the server 14 and the user ID is stored in the portable terminal 12, short-range communication may become possible between the communication unit of the portable terminal 12 and the communication unit 40 of the digital signage 16 when the user carrying the portable terminal 12 with him or her approaches the digital signage 16. The viewer identification unit 56 may detect a viewer when the digital signage 16 receives a user ID from the portable terminal 12 via the short-range communication and identify the viewer by comparing the received user ID with the user DB 26.

Alternatively, the viewer identification unit 56 may detect or identify a viewer using a dedicated portable device used in a shared work space. The dedicated portable device stores at least a user ID and includes a short-range communication function. The viewer identification unit 56 may detect a viewer when the digital signage 16 receives a user ID from the dedicated portable device via short-range communication, and furthermore, may identify the viewer by comparing the received user ID with the user DB 26.

The degree of interest determination unit 58 determines the degree of interest of a viewer identified by the viewer identification unit 56 in the content 24a displayed on the display 42. In the case where plural viewers are present, the degree of interest determination unit 58 determines the degree of interest of plural viewers. In this exemplary embodiment, the degree of interest determination unit 58 determines the degree of interest of a viewer, based on a photographed image acquired by the imaging unit 50.

Specifically, the degree of interest determination unit 58 determines the degree of interest of a viewer, based on at least one of the distance from the digital signage 16 (more specifically, the display 42) to the viewer, the time during which the viewer stays near the digital signage 16, and the sight direction of the viewer, which are detected by analyzing a photographed image. Obviously, the degree of interest determination unit 58 may determine the degree of interest of a viewer by combing the above factors together.

Regarding the distance from the display 42 to a viewer, it may be determined that the degree of interest of the viewer in the content 24a increases as the distance decreases. This is because in general a person looks at content 24a with a higher degree of interest from a closer position.

Furthermore, it may be determined that the degree of interest of a viewer in content 24a increases as the time during which the viewer stays near the digital signage 16 increases. This is because it is estimated that the viewer views the content 24a displayed on the display 42 for a longer time as the time during which the viewer stays near the digital signage 16 increases and it is thus estimated that the viewer is more interested in the content 24a when the viewer views the content 24a for a longer time. The time during which a viewer stays near the digital signage 16 may be detected based on a time during which the viewer identification unit 56 continuously detects the viewer.

Furthermore, it may be determined that the degree of interest of a viewer in content 24a increases as the time during which the sight direction of the viewer is toward the display 42 increases. The sight direction of a viewer may be detected based on, for example, the position of the viewer, the orientation of the face of the viewer, the shape of eyes of the viewer, the position of pupils of the viewer, and the like, which are obtained by analyzing a photographed image.

The degree of interest may be represented by a predetermined index. For example, the degree of interest may be represented by numerical values from "1" to "10", and a larger numerical value may represent a higher degree of interest in corresponding content 24*a*. For example, in the case where the viewer identification unit 56 continuously detects a viewer for thirty seconds or more while the content 24*a* is being displayed on the display 42, the degree of interest determination unit 58 changes the degree of interest of the viewer in the content 24*a* from "1" to "2". Furthermore, in the case where the viewer identification unit 56 continuously detects the viewer for one minutes or more, the degree of interest determination unit 58 changes the degree of interest of the viewer in the content 24*a* from "2" to "3".

Furthermore, in the case where plural pieces of content 24*a* are displayed at the same time on the display 42, the degree of interest determination unit 58 determines the degree of interest of a viewer for each of the plural pieces of displayed content 24*a*. In this case, the degree of interest determination unit 58 identifies the content 24*a* that the viewer is viewing from among the plural pieces of the content 24*a*, and determines the degree of interest of the viewer in the identified content 24*a* in accordance with the time during which the viewer is viewing the identified content 24*a*. The content 24*a* that a viewer is viewing among plural pieces of displayed content 24*a* may be identified by detecting the sight direction of the viewer.

In this exemplary embodiment, the degree of interest determination unit 58 determines the degree of interest of a viewer, based on a photographed image acquired by the imaging unit 50. However, the degree of interest determination unit 58 may determine the degree of interest directly based on input from a viewer. For example, the controller 54 causes content 24*a* and plural buttons with which a viewer inputs the degree of interest in the content 24*a*, such as buttons "1" to "10" which are displayed along with text "How much are you interested in this content?", to be displayed on the display 42. The degree of interest determination unit 58 may determine the degree of interest of the viewer in the content 24*a* in accordance with a button touched by the viewer.

When the degree of interest of a viewer in the content 24*a* displayed on the display 42 has reached a predetermined value or more, the personal information display controller 60 causes the content 24*a* and personal information of the viewer registered in the user DB 26 to be displayed on the display 42. The predetermined value may be set in advance and may be stored in advance in the memory 22 of the server 14 or the memory 52 of the digital signage 16. Specifically, by being triggered by the determination by the degree of interest determination unit 58 that the degree of interest of a viewer (who is identified by the viewer identification unit 56) in the content 24*a* is equal to or more than the predetermined value, the personal information display controller 60 refers to the user DB 26 and acquires personal information of the viewer. Then, the personal information display controller 60 causes the acquired personal information to be displayed on the display 42.

By displaying the content 24*a* and personal information of a viewer, a person different from the viewer (for example, another viewer; hereinafter, will be simply referred to as "another person") may obtain the background of the viewer and information indicating that the viewer is interested in the content 24*a*. Accordingly, if the person is also interested in the content 24*a*, the person may easily talk to the viewer about the content 24*a* as a common topic because the person knows that the person and the viewer have a common interest, such as the content 24*a*. Furthermore, knowing the background of a viewer by viewing personal information of the viewer may also be a factor that another person may easily talk to the viewer. As described above, displaying the content 24*a* and personal information of a viewer achieves an effect that another person may easily talk to a viewer. Furthermore, even a viewer who is not good at talking to others may expect to be talked to by others if the viewer views the content 24*a* in which the viewer is interested.

By displaying personal information of a viewer, the possibility that the viewer will be talked to by others may increase. Therefore, a viewer who does not want to be talked to by others may not desire that personal information of the viewer is displayed even in the case where the degree of interest of the viewer in the content 24*a* is equal to or more than the predetermined value. Thus, the personal information display controller 60 may cause the content 24*a* and personal information of a viewer to be displayed on the display 42 in the case where the degree of interest of the viewer in the displayed content 24*a* is equal to or more than the predetermined value and a want-to-be-talked-to flag for the viewer in the user DB 26 represents "1". In other words, even in the case where the degree of interest of a viewer in the displayed content 24*a* is equal to or more than the predetermined value, if a want-to-be-talked-to flag for the viewer represents "0", the personal information display controller 60 does not display personal information of the viewer. Accordingly, personal information of a viewer who does not want to may be prevented from being displayed.

Furthermore, in the case where the degree of interest of a viewer in content 24*a* has reached the predetermined value or more and the want-to-be-talked-to flag for the viewer in the user DB 26 represents "1", personal information of the viewer and text representing that the viewer is a person who wants to be talked to may be displayed on the display 42. Alternatively, in place of or in addition to the text representing that the viewer is a person who wants to be talked to, a figure representing that the viewer is a person who wants to be talked to (for example, an icon or mark) may be displayed. Accordingly, talking to the viewer by another person may be encouraged.

Furthermore, personal information of a viewer is displayed for the purpose of encouraging talking by others. Therefore, in the case where the viewer identification unit 56 detects plural viewers, personal information of the plural viewers may be displayed. In other words, in the case where only one viewer is detected, the personal information display controller 60 may not cause personal information of the viewer to be displayed even if the degree of interest of the viewer in the content 24*a* has reached the predetermined value or more.

Furthermore, in the case where the degree of interest of plural viewers in the displayed content 24*a* has reached the predetermined value or more, the personal information display controller 60 may switch between personal information of the plural viewers with certain time intervals or may display the personal information of the plural viewers at the same time.

Furthermore, as described above, personal information registered in the user DB 26 may include plural items, and the personal information display controller 60 may display contents of an item selected from among the plural items in accordance with the contents of the content 24*a* for which it is determined that the degree of interest of a viewer in the content 24*a* is equal to or more than the predetermined value. For example, in the case where the content 24*a* includes attribute information "for business", only contents of an item regarding business in personal information may be displayed. In the case where the content 24*a* includes attribute information "for hobby", only contents of an item regarding hobby in personal information may be displayed.

Furthermore, in the case where the positional information disclosure flag for the viewer in the user DB 26 represents "1", the personal information display controller 60 may cause personal information and positional information of the viewer to be displayed on the display 42. Accordingly, another person may easily find the viewer whose personal information is displayed.

Positional information of a viewer may be acquired, for example, based on the position of the viewer in a photographed image acquired by the imaging unit 50. Alternatively, the digital signage 16 may receive, via short-range communication, positional information acquired with a GPS function of the portable terminal 12 carried by the viewer, so that positional information of the viewer may be obtained based on the positional information.

Figure 5:
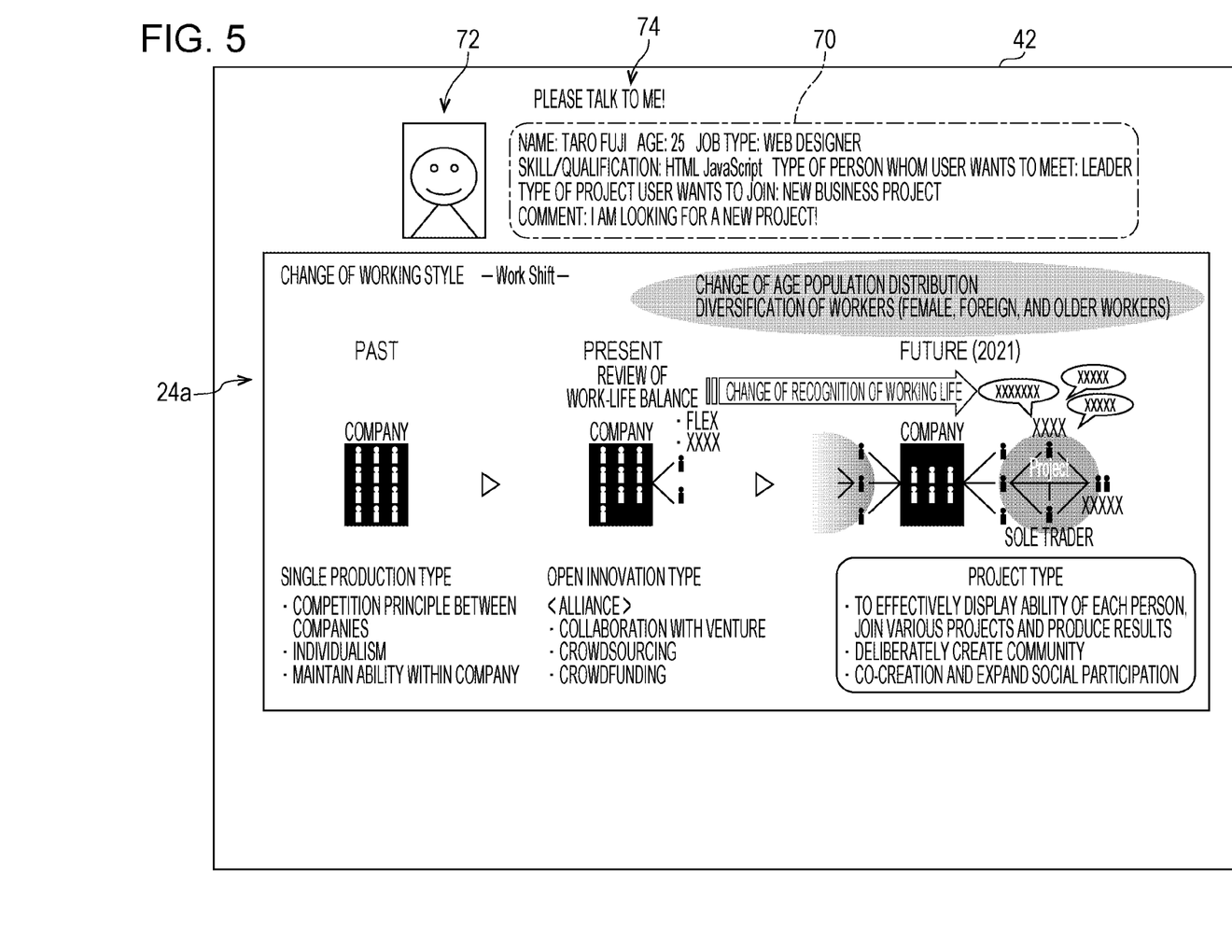
FIG. 5 is a diagram illustrating a first display example in which content and personal information of a viewer are displayed.

FIG. 5 illustrates a first display example in which the content 24*a* and personal information 70 of a viewer are displayed on the display 42. As illustrated in FIG. 5, in the case where the degree of interest of a viewer "Taro FUJI" in the content 24*a* has reached a predetermined value or more, the content 24*a* and the personal information 70 of the viewer "Taro FUJI are displayed in an upper part of the display 42. The content 24*a* illustrated in FIG. 5 is for business, and attribute information "for business" is assigned to the content 24*a*. Therefore, as illustrated in FIG. 5, the personal information display controller 60 does not display contents of "hobby" that is an item relatively less relevant to business among plural items included in personal information stored in the user DB 26, but displays contents of the other items.

Furthermore, the personal information display controller 60 may display the personal information 70 of the viewer "Taro FUJI" and a face photograph 72 of the viewer "Taro FUJI". As the face photograph 72, face image data of the viewer "Taro FUJI" registered in the user DB 26 may be displayed. Some viewers may not want their face photographs to be displayed. Therefore, a result of determination as to whether or not to display the face photograph 72 may be registered in advance, and the face photograph 72 may be displayed only in the case where a viewer permits his or her face photograph to be open to public. Furthermore, a symbol image different from face image data may be registered in the user DB 26, so that the symbol image may be displayed instead of the face photograph 72.

Furthermore, in the example of FIG. 5, the want-to-be-talked-to flag for the viewer "Taro FUJI" represents "1", and therefore, the personal information 70 and text 74 representing that the viewer "Taro FUJI" is a person who wants to be talked to are displayed. As described above, in place of or in addition to the text 74, an icon or mark representing that a viewer wants to be talked to may be displayed.

Figure 6:
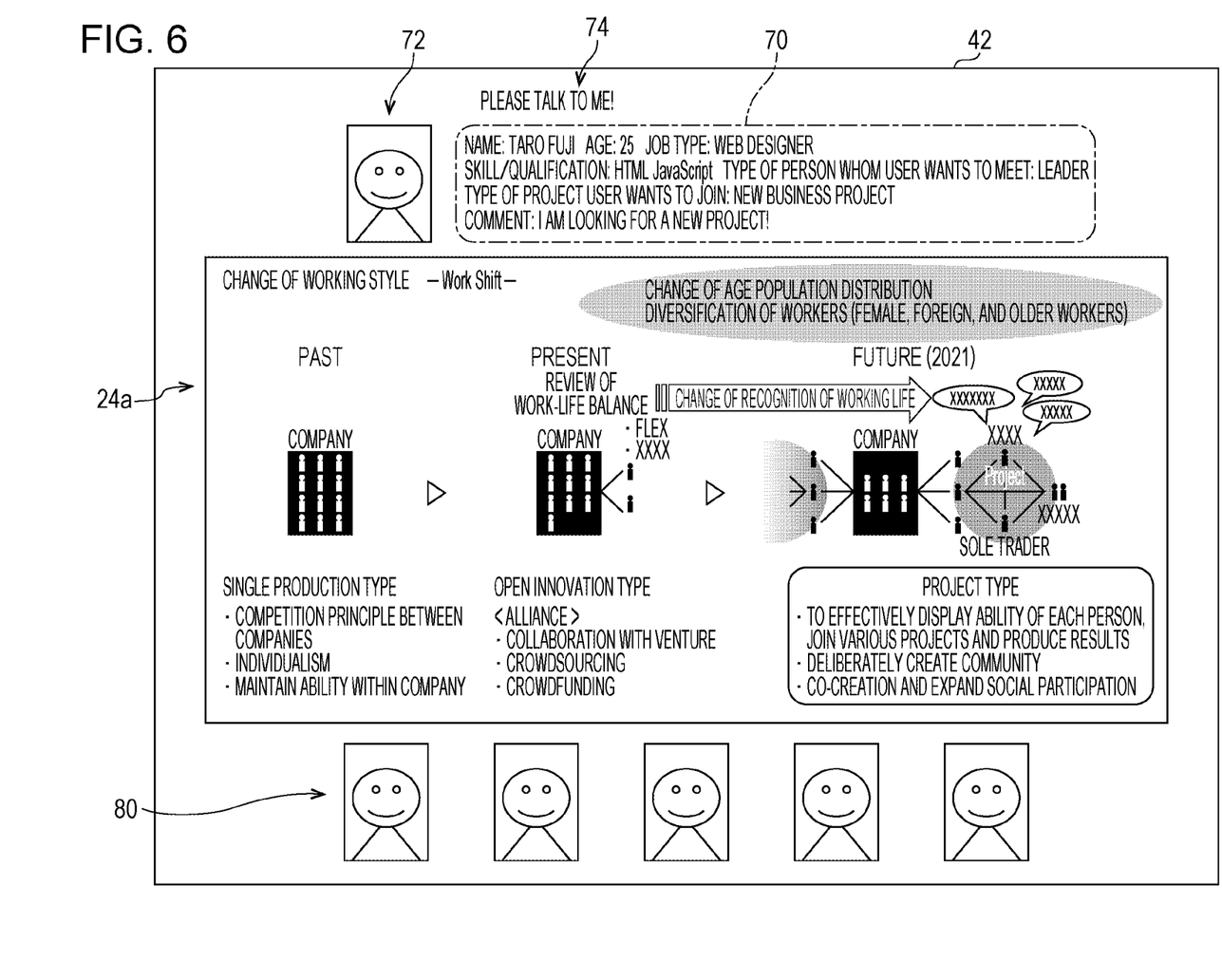
FIG. 6 is a diagram illustrating a second display example in which content and personal information of a viewer are displayed.

FIG. 6 illustrates a second display example in which the content 24*a* and the personal information 70 of a viewer are displayed on the display 42. In the case where the degree of interest of plural viewers in the content 24*a* is equal to or more than a predetermined value, as illustrated in FIG. 6, the personal information 70 and the face photograph 72 of a representative viewer among the plural viewers may be displayed on the display 42 and face photographs 80 of the other viewers may be displayed at the same time. In the example of FIG. 6, the personal information 70 and the face photograph 72 of the representative viewer are displayed in an upper part of the display 42, and the face photographs 80 of the other viewers are displayed in a lower part of the display 42. When one of the face photographs 80 is touched by a viewer, personal information of a viewer corresponding to the touched face photograph 80 may be pop-up displayed. In the lower part of the display 42, the face photograph 80 of a viewer who viewed the content 24*a* in the past and whose degree of interest in the content 24*a* was equal to or more than the predetermined value, apart from the viewers who are currently viewing the content 24*a*, may be displayed. For example, display may be provided in a separated manner such that the personal information 70 and the face photographs 72 of plural viewers who are currently viewing the content 24*a* are sequentially displayed in a switching manner in the upper part of the display 42 and the face photographs 80 of viewers who viewed the content 24*a* in the past are displayed in the lower part of the display 42.

Figure 7:
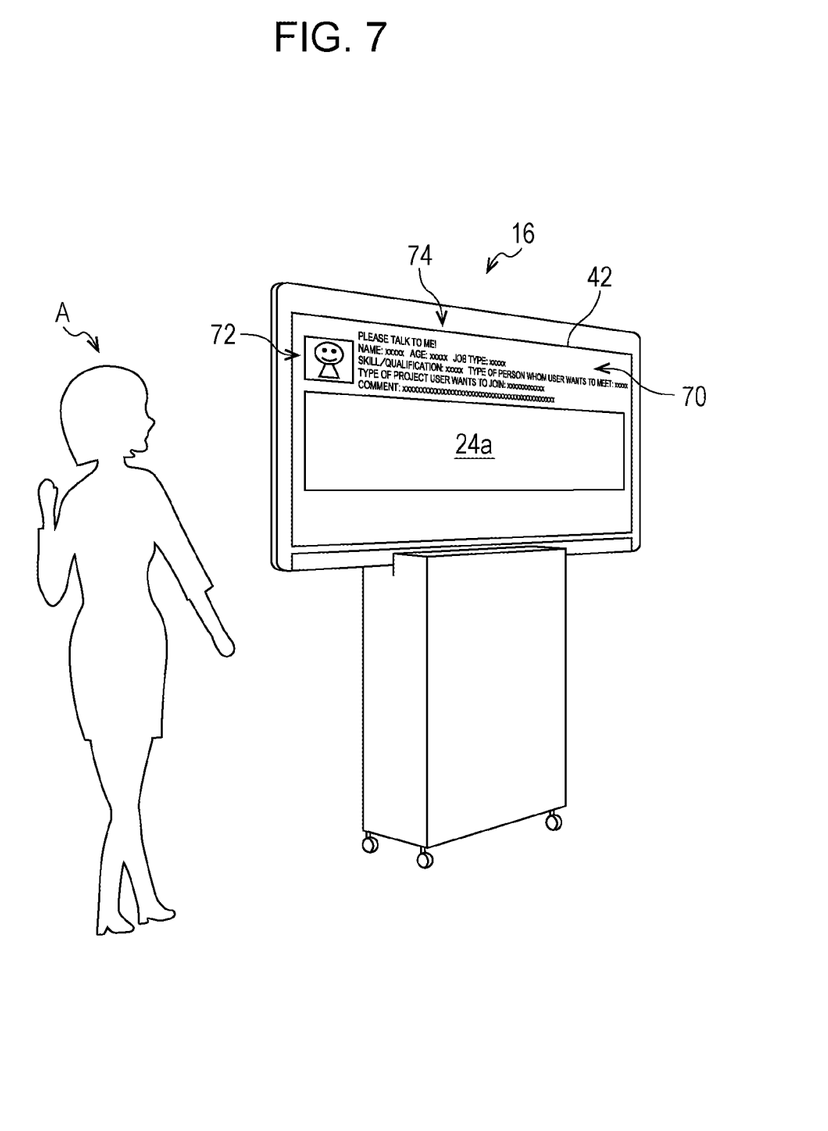
FIG. 7 is a diagram illustrating a digital signage in which a viewer who is viewing content, personal information of the viewer, and the like are displayed.

FIG. 7 illustrates a digital signage in which a viewer A who are viewing the content 24*a* and the personal information 70 and the face photograph 72 of the viewer A are displayed. As illustrated in FIG. 7, by displaying the personal information 70 or the face photograph 72 of the viewer A on the display 42, another person is able to easily understand that the viewer A is interested in the content 24*a*. In addition, by displaying text 74 "Please talk to me!", another person is able to easily understand that the viewer A is a person who wants to be talked to.

Figure 8:
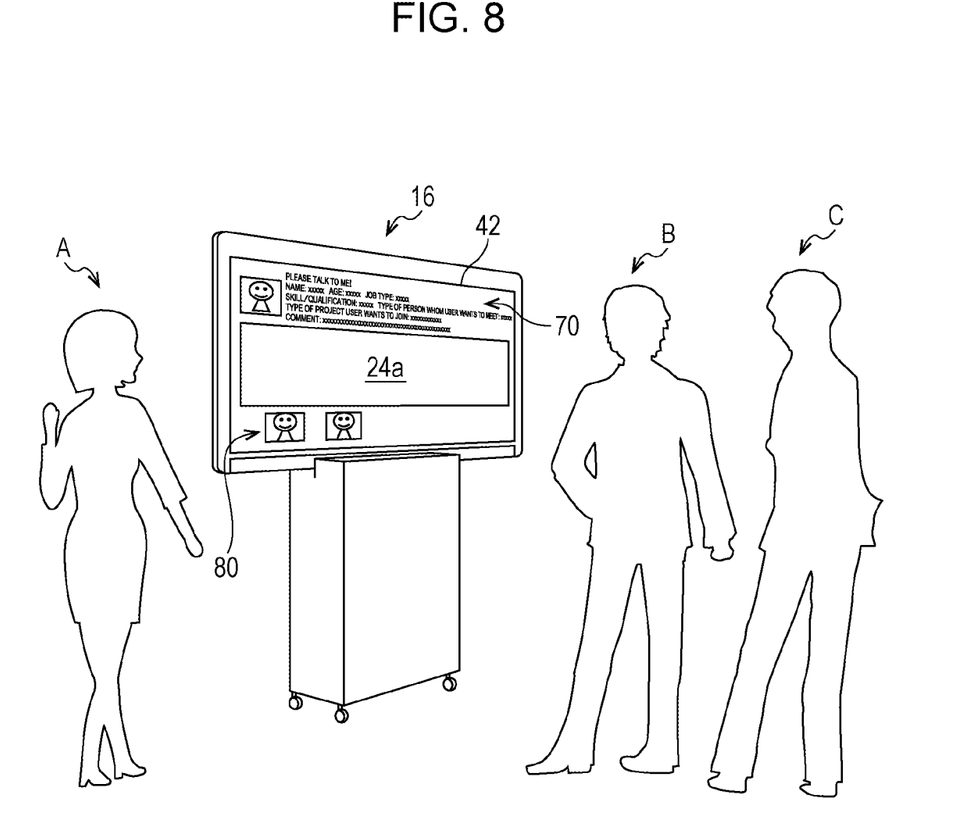
FIG. 8 is a diagram illustrating a digital signage in which plural viewers who are viewing content, personal information of a representative viewer, and the like are displayed.

FIG. 8 illustrates a digital signage in which viewers A to C who are viewing the content 24*a*, the personal information 70 of a representative viewer A, and the like are displayed. In FIG. 8, the personal information 70 and the like of the representative viewer A and the face photographs 80 of the other viewers B and C who are interested in the content 24*a* are displayed on the display 42. Accordingly, the viewer A is able to understand that the viewers B and C are also interested in the content 24*a*. Thus, the viewer A may easily talk to the viewers B and C, and the viewer A may relatively comfortably handle the situation in which the viewer A is talked to by the viewers B and C.

Referring back to FIG. 4, in the case where plural viewers are viewing the displayed content 24*a*, the interaction encouragement notification unit 62 provides various notifications for encouragement of interaction between the plural viewers. As described above, interaction between plural viewers is encouraged when the personal information display controller 60 displays personal information of a viewer. However, in particular, in the case where there is something in common in personal information of plural viewers, the interaction encouragement notification unit 62 provides a notification for encouraging interaction between the plural viewers.

For example, as illustrated in FIG. 8, a case where the viewer A and the viewer B are viewing the same content 24*a* will be discussed. In this case, the viewer identification unit 56 identifies the viewers A and B, and the interaction encouragement notification unit 62 refers to the user DB 26 to compare personal information of the viewer A with personal information of the viewer B. In the case where there is something in common between the personal information of the viewer A and the personal information of the viewer B, for example, in the case where the contents of the item "type of project a user wants to join" of the viewers A and B are "new business project", the interaction encouragement notification unit 62 displays text "The type of project that the viewer A and the viewer B want to join is a new business project." on the display 42. Accordingly, the viewers A and B are able to understand that both of them want to join a new business project, and interaction between the viewer A and the viewer B may further be encouraged. In particular, with a notification from the interaction encouragement notification unit 62, both talking to the viewer B by the viewer A and talking to the viewer A by the viewer B are encouraged.

The "case where there is something in common" includes not only a case where there is a similarity between contents of an item of personal information of both users but also a case where contents of personal information of both users match, such as, for example, a case where the contents of an item "skill and qualification" of the viewer A represent "HTML" and the contents of an item "type of person whom a user wants to meet" of the viewer B represent "person who has HTML skill".

Furthermore, in the case where want-to-be-talked-to flags for all the identified plural viewers represent "1", interaction between the plural viewers may be encouraged by outputting sound to the plural viewers from the sound output unit 44 and talking to the plural viewers. For example, in the case where both the viewers A and B are registered as people who want to be talked to, the interaction encouragement notification unit 62 outputs sound such as "Hi A and B, what do you think of the content 24a being displayed?". Preferably, the contents of output sound are a topic common in the viewer A and the viewer B. A common topic may be identified from a common point in personal information of the viewer A and the viewer B.

Sound output from the interaction encouragement notification unit 62 may be, for example, sound that encourages conversation between plural viewers or encourages body movement (for example, paper-rock-scissors or the like). Furthermore, the sound input unit 48 may acquire contents of conversation between plural viewers, and display contents on the display 42 may be changed according to the contents of the conversation. For example, the controller 54 analyzes conversation between plural viewers acquired by the sound input unit 48, and extracts one or more keywords (for example, "new project", "join", etc.). Then, the controller 54 transmits the extracted one or more keywords to the server 14. The controller 28 of the server 14 receives the one or more keywords, analyzes the contents of the content group 24, and identifies the content 24a (for example, a personnel recruitment article for a new project) corresponding to the received one or more keywords. Then, the identified content 24a is transmitted to the digital signage 16, and is displayed on the display 42.

Furthermore, in the case where the display 42 includes a transparent or semitransparent screen and a projector, a viewer who is present on the front side of the screen is able to visually recognize a viewer who is present on the back side of the screen. Therefore, even in the case where viewers are present on both sides of the screen, the interaction encouragement notification unit 62 outputs sound to the plural viewers, so that interaction between the plural viewers who are present on both sides of the screen may be encouraged.

Furthermore, in the case where two or more digital signages 16 are arranged and installed, the group of digital signages 16 may be associated with each other to encourage interaction between plural viewers who are viewing the group of digital signages 16. For example, in the case where there is a something in common in personal information of plural viewers who are viewing the digital signages 16, the interaction encouragement notification units 62 of the group of digital signages 16 may be associated with each other to output sound regarding a common topic to the plural viewers who are viewing the group of digital signages 16.

In the case where plural viewers interact with each other by being triggered by viewing the digital signage 16, the plural viewers may input information indicating that the interaction took place to the digital signage 16. Specifically, an input field for inputting user IDs or the like of plural viewers who interacted with each other is displayed on the display 42, so that the plural viewers may input their user IDs. The plural viewers who interacted with each other may be registered in the server 14, and the server 14 may provide personal information of the plural viewers to each of the viewers. For example, when a contact address of a viewer is registered in the server 14, the server 14 may transmit the contact address or personal information of the viewer to a contact address of a person with which the viewer interacted.

The digital signage system 10 according to this exemplary embodiment has been described above. The flow of a process of the digital signage 16 will be described below with reference to a flowchart illustrated in FIG. 9. At the start of the flowchart illustrated in FIG. 9, user information of individual users has already been registered, and the digital signage 16 is in a sleep mode. The sleep mode represents a power-saving mode in which only part of the digital signage 16 including the input unit 46, the imaging unit 50, and the viewer identification unit 56 operates.

Figure 9:
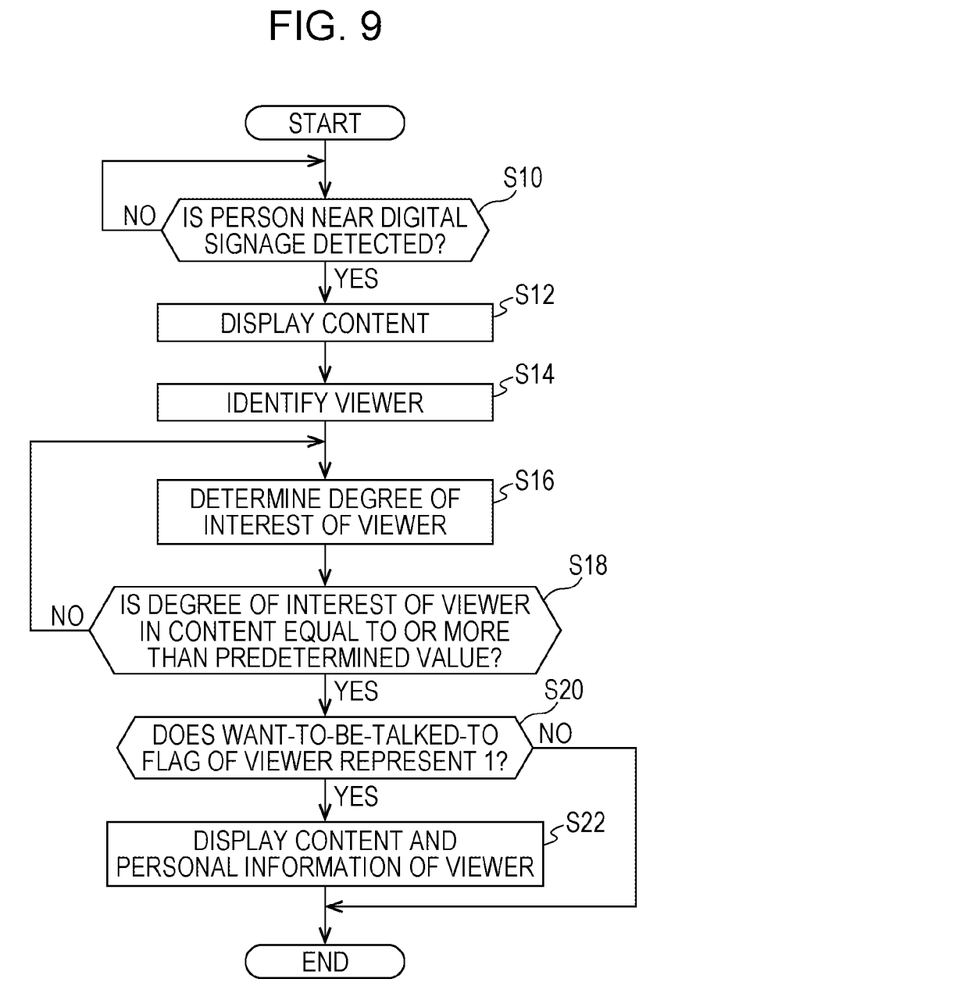
FIG. 9 is a flowchart illustrating the flow of a process of a digital signage according to an exemplary embodiment.

In step S10, the viewer identification unit 56 determines whether or not a person who is present near the digital signage 16 is detected. The digital signage 16 maintains the sleep mode until a person has reached near the digital signage 16. In the case where the viewer identification unit 56 detects a person who is present near the digital signage 16, the process proceeds to step S12.

In step S12, the digital signage 16 returns to a normal operation mode from the sleep mode, and the controller 54 causes the content 24a received from the server 14 to be displayed on the display 42.

In step S14, the viewer identification unit 56 identifies the person detected in step S10, based on a photographed image acquired by the imaging unit 50.

In step S16, the degree of interest determination unit 58 determines the degree of interest of the person (viewer) identified in step S14 in the content 24a displayed in step S12.

In step S18, the personal information display controller 60 determines whether or not the degree of interest of the viewer determined in step S16 is equal to or more than a predetermined value. The degree of interest of a viewer varies with time. Therefore, in the case where the degree of interest of the viewer is less than the predetermined value, the process returns to step S16. The processing of steps S16 and S18 is repeated until the viewer identification unit 56 does not detect the viewer (that is, until the viewer moves away from the digital signage 16) as long as the degree of interest of the viewer is less than the predetermined value. In the case where it is determined in step S18 that the degree of interest of the viewer is equal to or more than the predetermined value, the process proceeds to step S20.

In step S20, the personal information display controller 60 determines, by referring to the user DB 26, whether or not the want-to-be-talked-to flag for the viewer represents "1". In the case where the want-to-be-talked-to flag for the viewer represents "1", the process proceeds to step S22. In the case where the want-to-be-talked-to flag for the viewer represents "0", the process ends.

In step S22, the personal information display controller 60 causes the content 24a displayed in step S12 and personal information of the viewer to be displayed on the display 42.

An exemplary embodiment of the present invention has been described above. However, the present invention is not limited to the exemplary embodiment described above.

Various changes may be made to the present invention without departing from the scope of the present invention.

For example, in the digital signage system 10 according to the foregoing exemplary embodiment, the server 14 collectively manages the content 24a displayed at the digital signage 16. However, the digital signage 16 may control display content. That is, the controller 54 of the digital signage 16 may include a function of the content controller 30, and the content group 24 may be stored in the memory 52 of the digital signage 16. Furthermore, the portable terminal 12 and the digital signage 16 may constitute the digital signage system 10, by eliminating the server 14. In this case, all the content group 24, the user DB 26, and the content controller 30, which are originally included in the server 14, may be included in the digital signage 16.

Furthermore, individual functions of the viewer identification unit 56, the degree of interest determination unit 58, the personal information display controller 60, and the interaction encouragement notification unit 62, which are originally included in the controller 54 of the digital signage 16 in the foregoing exemplary embodiment, may be provided in the server 14. In this case, a photographed image acquired by the imaging unit 50 is transmitted to the server 14 from the digital signage 16. The viewer identification unit 56 and the degree of interest determination unit 58, which are provided in the server 14, perform processing based on the received photographed image. Furthermore, the personal information display controller 60, which is provided in the server 14, transmits a display instruction to display personal information of a viewer on the display 42 to the digital signage 16. Furthermore, the interaction encouragement notification unit 62, which is provided in the server 14, transmits an output instruction to output a notification for encouraging interaction between plural viewers to the digital signage 16.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display device comprising:
a display configured to display content;
at least one processor configured to execute:
a viewer identification unit that identifies a viewer who is viewing the content; and
a personal information display controller that, in response to determining that a degree of interest of the viewer in the displayed content has reached a predetermined value or more, controls the display to display the content and pre-registered personal information about the viewer,
wherein the displayed pre-registered personal information is not included in the displayed content,
wherein the at least one processor is configured to register in advance a want-to-be-talked-to flag indicating whether or not the viewer wants to be talked to by others,
wherein if the degree of interest has reached the predetermined value or more and a value of the want-to-be-talked-to flag indicates that the viewer wants to be talked to by others, then the personal information display controller causes the personal information about the viewer to be displayed, and
wherein the personal information display controller causes the personal information about the viewer to be displayed only in response to determining both that the degree of interest has reached the predetermined value or more and that the value of the want-to-be-talked-to flag indicates that the viewer wants to be talked to by others.

2. The display device according to claim 1, wherein the at least one processor is configured to register in advance whether or not the viewer wants to be talked to by others, and
wherein, if the degree of interest has reached the predetermined value, or more and the viewer is registered as a person who wants to be talked to by others, then the personal information display controller causes the personal information about the viewer to be displayed.

3. The display device according to claim 2, wherein the personal information display controller causes text or a figure representing that the viewer is the person who wants to be talked to by others to be displayed.

4. The display device according to claim 2, wherein the personal information display controller causes the personal information about the viewer to be displayed only in response to determining that the degree of interest has reached the predetermined value or more and the viewer is registered as a person who wants to be talked to by others.

5. The display device according to claim 1, wherein the pre-registered personal information about the viewer includes a plurality of items, and
wherein the personal information display controller causes contents of an item selected from among the plurality of items to be displayed, in accordance with contents of the content.

6. The display device according to claim 1, wherein the at least one processor is further configured to execute:
an interaction encouragement notification unit that provides, if there is something in common in the personal information about a plurality of viewers who are viewing the content, a notification for encouraging interaction between the plurality of viewers.

7. The display device according to claim 6, wherein if all the plurality of viewers are registered in advance as people who want to be talked to by others, then the interaction encouragement notification unit outputs sound for encouraging interaction between the plurality of viewers.

8. The display device according to claim 1, further comprising:
a microphone that acquires conversation between a plurality of viewers who are viewing the content,
wherein contents of the content displayed on the display are changed in accordance with contents of the conversation.

9. The display device according to claim 1, wherein personal information display controller, in response to determining that the degree of interest of the viewer in the displayed content has reached the predetermined value or more, controls the display to simultaneously display the content and pre-registered personal information about the viewer.

10. A non-transitory computer readable medium storing a program that when executed causes a computer to execute a process comprising:
 displaying content;
 identifying a viewer who is viewing the content; and
 controlling, in response to determining that a degree of interest of the viewer in the displayed content has reached a predetermined value or more, the content and pre-registered personal information about the viewer to be displayed,
 wherein the displayed pre-registered personal information is not included in the displayed content,
 wherein the process further comprises registering in advance a want-to-be-talked-to flag indicating whether or not the viewer wants to be talked to by others, and
 wherein the personal information about the viewer is displayed only in response to determining both that the degree of interest has reached the predetermined value or more and that the value of the want-to-be-talked-to flag indicates that the viewer wants to be talked to by others.

* * * * *